United States Patent
Koktan et al.

(10) Patent No.: US 7,734,949 B2
(45) Date of Patent: Jun. 8, 2010

(54) INFORMATION ERROR RECOVERY APPARATUS AND METHODS

(75) Inventors: Toby James Koktan, Nepean (CA); Larry Friesen, Nepean (CA)

(73) Assignee: Alcatel Lucent, Paris (FR)

( * ) Notice: Subject to any disclaimer, the term of this patent is extended or adjusted under 35 U.S.C. 154(b) by 645 days.

(21) Appl. No.: 11/394,261

(22) Filed: Mar. 30, 2006

(65) Prior Publication Data

US 2007/0234101 A1    Oct. 4, 2007

(51) Int. Cl.
   *G06F 11/00*    (2006.01)
(52) U.S. Cl. ............... 714/5; 714/2; 714/6; 714/42; 714/54
(58) Field of Classification Search ............ 714/2, 714/5
   See application file for complete search history.

(56) References Cited

U.S. PATENT DOCUMENTS

| | | | | |
|---|---|---|---|---|
| 4,905,188 A | * | 2/1990 | Chuang et al. | 711/128 |
| 4,924,466 A | * | 5/1990 | Gregor et al. | 714/2 |
| 5,325,517 A | * | 6/1994 | Baker et al. | 714/11 |
| 5,392,445 A | * | 2/1995 | Takamoto et al. | 711/114 |
| 5,418,916 A | * | 5/1995 | Hall et al. | 712/228 |
| 5,666,513 A | * | 9/1997 | Whittaker | 711/118 |
| 5,737,514 A | * | 4/1998 | Stiffler | 714/13 |
| 2004/0117579 A1 | * | 6/2004 | Wu et al. | 711/170 |
| 2005/0289439 A1 | * | 12/2005 | Nerl et al. | 714/763 |

OTHER PUBLICATIONS

Tanenbaum, "Structured Computer Organization", 1990, Prentice Hall, 3rd ed, pp. 11.*

* cited by examiner

*Primary Examiner*—Emerson C Puente
(74) *Attorney, Agent, or Firm*—Ecker Seamans Cherin & Mellott LLC

(57) ABSTRACT

Information error recovery apparatus and methods are disclosed. Responsive to an error detected in information retrieved from an information store for use by a processor in a software execution flow, the software execution flow of the processor is suspended. Use of the information store by the processor is also disabled. The software execution flow of the processor is allowed to resume using information from a further information store in which the retrieved information is also stored. This allows recovery from errors without resetting the processor. The information store may be reloaded from the further information store and re-enabled for use by the processor. The information store and the further information store are a cache and a main memory, respectively, in one embodiment.

18 Claims, 2 Drawing Sheets

INFORMATION ERROR RECOVERY APPARATUS AND METHODS

FIELD OF THE INVENTION

This invention relates generally to information processing and, in particular, to recovering from errors.

BACKGROUND

An information store such as a cache can be used to reduce the time that it takes a processor to access memory for instructions and data. A cache is a smaller but faster memory that stores copies of information from the most frequently used main memory locations. Nearly all microprocessor systems employ cache memories for this performance benefit. Typically, cache memories consist of a Level 1 (L1)cache, which is relatively small and internal to the processor itself, and a larger Level 2 (L2)cache, which is implemented using external Synchronous Static Random Access Memory (SSRAM) devices that are not Error Correction Coding (ECC) protected.

Single- or multi-bit errors that affect L2 cache memory contents may arise in any of various scenarios. Errors may occur, for example, during transfer of data or instructions (writes) from a Central Processing Unit (CPU) main memory to the cache, during transfer of data or instructions (reads) from the cache to the CPU, or during modification of data in the cache as instructions are executed. Cache memory data or instruction contents can also be corrupted due to soft errors, firm errors, and/or hard errors while information is stored in an external memory device.

The causes of data or instruction corruption in CPU to L2 cache memory systems may include, for example, any or all of marginal timing variations occurring naturally in a design due to component and/or manufacturing differences that affect operational characteristics of components, memory or other component manufacturing defects that cause intermittent "glitches" in a system under a specific set of conditions, and soft-errors due to external phenomena such as cosmic rays.

SSRAM devices, which are often used to implement cache memories, tend to be susceptible to a number of factors such as temperature, humidity, equipment slot for electronic card-based implementations, noise, etc. Another error influencer is ionizing radiation or cosmic rays that occur naturally in the environment. The density of SSRAM memory cells is such that if they encounter one of these high energy particles, the value or bit in an SSRAM memory cell can be changed, an effect known as bit flipping.

As noted above, external L2 cache memories are not normally ECC protected. Even if ECC protection were provided for an L2 cache, the issue of error handling would not be completely solved since ECC schemes have limited error correction capabilities. Therefore, in external L2 cache applications, single- and most multi-bit errors in the L2 cache memory are detected on the CPU as parity errors.

Errors and corruption are generally considered serious enough to halt execution of the CPU entirely so as to eliminate the risk of processing a "bad instruction" or proceeding with processing based on corrupted data. The CPU is then reset as a result of the error/corruption. However, if the error/corruption does not affect data that has been modified only in the cache (i.e., data that has not been synchronized between the cache and the main memory), this simple response is exaggerated and may cause a long and unnecessary interruption in services inherent in the CPU.

Traditional approaches for responding to or correcting L2 cache errors include detecting an error in software and triggering a system crash, which requires a complete reset to recover from the detected error and can result in a significant disruption in a software application or the operation of a communication network, for example. Some systems may employ software processes that periodically "flush-out" cache memories to main memory during idle times to mitigate the effect of soft-errors on stored data. Hardware-based ECC approaches that use ECC for detecting and correcting single-bit errors can mitigate the impact of errors or corruption, but do not eliminate the problem in that multi-bit errors can be detected but not corrected. ECC-based error checking also tends to be slow.

Thus, there remains a need for improved information error recovery mechanisms.

SUMMARY OF THE INVENTION

Some embodiments of the invention provide a low-impact centralized means of recovering, in software and in real-time, from CPU to L2 cache errors that might occur due to a number of different factors, so as to reduce downtime and maintenance resources in systems that employ such processor/cache architectures.

According to an aspect of the invention, an apparatus includes an error detector operable to detect an error in information retrieved from an information store for use by a processor in a software execution flow, and an error recovery module operatively coupled to the error detector. The error recovery module is operable, responsive to an error detection by the error detector, to suspend the software execution flow of the processor, to disable use of the information store by the processor, and to allow the software execution flow of the processor to resume using information from a further information store in which the retrieved information is also stored.

At least one of the error detector and the error recovery module may be implemented in software for execution by the processor.

The error detector may be operable to detect an error based on at least one of: a parity check and an error correction code check.

The error recovery module may be further operable to determine a history of errors detected by the error detector, and to determine whether to disable use of the information store and allow the software execution flow to resume based on the determined history and at least one of a time criterion and a number of detected errors criterion.

In some embodiments, the error recovery module is operable to determine that the detected error is not recoverable where the determined history satisfies the time criterion or the number of detected errors criterion, and, where the information error is not recoverable, to perform an escalation operation.

The error recovery module may be further operable to determine an amount of modified information stored in the information store but not stored in the further information store, and to determine whether to disable use of the information store and allow the software execution flow to resume based on the determined amount of modified information and a threshold.

The error recovery module may also disable the error detector while the software execution flow is suspended.

Modified information in the information store may be propagated to the further information store by the error recovery module.

The information store may include respective memory areas for storing instructions and data. In this case, the error recovery module may be further operable to determine whether the retrieved information comprises an instruction or data, to cause reloading of the instruction memory area of the information store from the further information store where the retrieved information comprises an instruction, and to cause reloading of the data memory area of the information store from the further information store where the retrieved information comprises data.

In one embodiment, the information store comprises an L2 cache, the further information store comprises a main memory, the processor comprises an internal L1 cache that has respective memory areas for storing instructions and data, and the error recovery module is further operable to determine whether the retrieved information comprises an instruction or data, to cause reloading of the L2 cache and the instruction memory area of the L1 cache from the main memory where the retrieved information comprises an instruction, and to cause reloading of the L2 cache and the data memory area of the L1 cache from the main memory where the retrieved information comprises data.

The error recovery module may cause reloading of the information store from the further information store by re-enabling use of the information store by the processor.

The apparatus may be implemented, for example, in an electronic device that also includes a processor and respective different memory devices operatively coupled to the processor and comprising the information store and the further information store.

A method is also provided, and includes monitoring information, which is retrieved from an information store for use by a processor in a software execution flow, to detect errors, and, responsive to detection of an error in the retrieved information, suspending the software execution flow of the processor, disabling use of the information store by the processor, and allowing the software execution flow of the processor to resume using information from a further information store in which the retrieved information is also stored.

The operation of monitoring may involve performing at least one of: a parity checking operation and an error correction code checking operation.

The method may also include, responsive to detection of an error in the retrieved information, determining whether the detected error is recoverable based on at least one of: a time record of detected errors, a number record of detected errors, and an amount of modified information stored in the information store but not stored in the further information store. Where the detected error is not recoverable an escalation operation may be performed. The escalation operation may include at least one of: raising an alert and resetting the processor.

In some embodiments, the method also includes identifying modified information in the information store, and propagating the identified modified information from the information store to the further information store.

If the information store comprises respective memory areas for storing instructions and data, the method may also include determining whether the retrieved information comprises an instruction or data, and causing a reload of either the instruction memory area or the data memory area of the information store based on whether the retrieved information comprises an instruction or data.

The information store may comprise an L2 cache, the further information store may comprise a main memory, and the processor may comprise an internal L1 cache that has respective memory areas for storing instructions and data, in which case the method may also include determining whether the retrieved information comprises an instruction or data, and causing a reload of the L2 cache and either the instruction memory area or the data memory area of the L1 cache based on whether the retrieved information comprises an instruction or data.

In some embodiments, the method also includes flushing the information store, and re-enabling use of the information store by the processor.

The method may be embodied, for example, in instructions stored on a machine-readable medium.

Another aspect of the invention provides an apparatus that includes an error detector for detecting errors in information read from an external cache for use by a processor in a software execution flow, and an error recovery module operatively coupled to the error detector and operable, responsive to an error detection by the error detector, to temporarily disable use of the external cache by the processor, to flush the external cache, and to re-enable use of the external cache by the processor.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
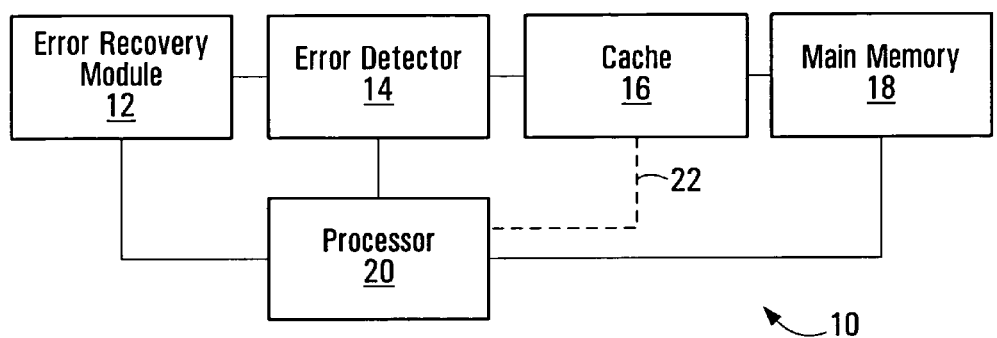
FIG. 1 is a block diagram of an electronic device.

FIG. 1 is a block diagram of an electronic device in which embodiments of the invention may be implemented. The electronic device 10 includes a processor 20, an error recovery module 12 operatively coupled to the processor 20, an error detector 14 operatively coupled to the error recovery module 12 and to the processor 14, a cache 16 operatively coupled to the error detector 14, and a main memory 18 operatively coupled to the cache 16 and to the processor 20.

The processor 20 may be operatively coupled to the cache 16 directly, as shown at 22, or indirectly, through the error detector 14. The two types of interconnections represent different access and error detection schemes, as described in further detail below.

The device 10 represents one possible implementation of an embodiment of the invention. Other embodiments having fewer, further, or different components with similar or different interconnections are also contemplated. The invention is in no way limited to the specific example shown in FIG. 1. For example, electronic devices in which embodiments of the invention are implemented may include other components than those explicitly shown.

The types of connections through which the components of FIG. 1 are operatively coupled may, to at least some extent, be implementation-dependent. Electronic devices often use various types of physical connectors and wired connections. In the case of cooperating software functions, for example, an operative coupling may be through variables or registers, and thus be more so a logical coupling than a physical coupling.

The electronic device 10 may be implemented in virtually any processing environment. Embodiments of the invention may be particularly suited to high reliability applications, since information errors may be recoverable without resetting the processor 20, as described in further detail below. Error recovery mechanisms that reduce the amount of processor down time might be beneficial in communication network equipment applications, for example, to minimize communication service disruptions when errors in the information stored in the cache 16 are detected.

Those skilled in the art will be familiar with many examples of the processor 20 that are available from various vendors. The operation of such processors will also be well understood. Therefore, details of the processor 20 are described herein only to the extent necessary to convey an understanding of embodiments of the invention. Error detection and recovery as disclosed herein are in no way restricted to any particular type, structure, or operation of the processor 20. In general, the processor 20 executes software instructions and may manipulate data according to those instructions. The data and instructions are stored in the main memory 18, and the most frequently used instructions and/or data may also be stored in the cache 16 to reduce memory access times.

Hardware, software, firmware, or combinations thereof may be used to implement the error recovery module 12, and possibly the error detector 14. Microprocessors, microcontrollers, Programmable Logic Devices (PLDs), Field Programmable Gate Arrays (FPGAs), Application Specific Integrated Circuits (ASICs), and other types of "intelligent" integrated circuits may be suitable for this purpose. In one embodiment, the error recovery module 12 and the error detector 14 are implemented in software for execution by the processor 20.

The cache 16 and the main memory 18 represent memory devices for storing instructions and/or data. The cache 16 would in most implementations be a smaller capacity but higher speed memory device than the main memory 18. Information is copied from the main memory 18 into the cache 16 for faster access by the processor 20. Solid state memory devices such as SSRAM devices are commonly used for cache memories. The main memory 18 may also be implemented using one or more solid state memory devices, although other types of memory devices, including memory devices for use with movable or even removable storage media, may also or instead be used for at least the main memory 18.

As noted above, the error recovery module 12 and the error detector 14 may be implemented using hardware, software, and/or firmware. These components are therefore described herein primarily in terms of their function. Based on the functional descriptions, a person skilled in the art will be enabled to implemented error recovery techniques according to embodiments of the invention in any of various ways.

In operation, the processor 20 retrieves information, which may include instructions and/or data, from the cache 16 or the main memory 18 during a software execution flow. Typically, if use of the cache 16 is enabled on the processor 20, through a register setting for instance, the processor will first look to the cache for a required instruction or data, and then revert to the main memory 18 if the required instruction or data is not in the cache. Where an instruction being executed by the processor 20 results in modification of data in the cache 16, then the processor modifies the data in the cache, and the modified data is propagated to the main memory 18. The processor 20 may set a bit or flag, for example, to indicate that a block of the cache 16 has been modified, and any modified blocks are pushed to the main memory 18 the next time a synchronization operation is performed to synchronize the contents of the cache and the main memory. Synchronization operations may be performed periodically, each time data is modified in the cache 16 by the processor 20, when the processor 20 is idle, or according to some other update schedule or procedure.

The error detector 14 is operable to detect an error in information that is retrieved from the cache 16 for use by the processor 20 in a software execution flow. An error detection process may be performed before information is passed to the processor 20, where the processor accesses the cache 16 indirectly through the error detector 14. The processor 20 may instead directly retrieve information from the cache 16 over the connection 22, or receive information from the error detector 14 before error checking operations have been completed. Thus, the processor 20 may begin processing a retrieved instruction or data while the error detector 14 is checking the instruction or data for errors.

Error detection by the error detector 14 may involve performing such operations as a parity check and/or an error correction code check. Relatively fast error detection operations may be preferred so as to detect errors as quickly as possible. Fast error detection reduces delays in providing required information to the processor 20 where information is checked for errors before it is provided to the processor. If the processor 20 begins processing information before the error checking has been completed, fast error detection reduces the amount of processing that would be performed by the processor on a corrupted instruction or erroneous data. A parity check, for example, can normally be performed in a single timing cycle, and represents an example of a fast error detection operation. Other error detection operations may also or instead be used by the error detector 14.

The error recovery module 12 supports a mechanism for recovering from information errors such as parity errors detected by the error detector 14 in information retrieved by the processor 20 from the cache 16. Since information in the cache 16 is also stored in the main memory 18, corruption of cache information, including instructions and/or data, is potentially recoverable without entirely resetting the processor 20. Detection of parity errors, for example, may occur early enough in the processing pipeline to be recoverable, even if the processor 20 has begun its processing of a corrupted instruction or corrupted data. The effects of corrupted instructions or data may thereby be prevented from propagating in a system from the cache 16 to registers, other caches, the main memory 18, etc.

Responsive to an error detection by the error detector 14, the error recovery module 12 suspends a current software execution flow of the processor 20. This either stops the processing of a corrupted instruction or corrupted data by the processor 20 or prevents the processor 20 from starting its processing of the corrupted instruction or data. According to one embodiment, software implementing the error recovery module 12 waits for an indication of a cache parity error. Upon detection of an error, the error detector 14 generates a high-priority processor exception or interrupt. In this case, the error recovery module 12 may be invoked as part of the exception or interrupt handling process, which also suspends the current software flow of execution by the processor 20. A low-level recovery process, optimized to run as quickly and efficiently as possible to limit system impact, may then be performed by the error recovery module 12.

As part of the recovery process, the error recovery module 12 disables use of the cache 16 by the processor 20, illustratively by controlling a processor register setting. The error recovery module 12 may also cause the cache 16 to be reloaded from the main memory 18. The cache 16, as noted above, typically stores a duplicate copy of the most frequently used information in the main memory 18. That information, however, is not deleted from the main memory 18, and thus the cache 16 can be reloaded from the main memory.

The cache reloading process may involve flushing the cache 16 to push or otherwise propagate any modified information in the cache, identified by bits or flags associated with particular data side cache lines for example, from the cache to the main memory 18. The cache 16 may then be automatically reloaded when use of the cache by the processor 20 is re-enabled or when the software execution flow of the processor is resumed.

The cache 16 may include respective, independently controllable memory areas for storing instructions and data. In this case, a determination may be made as to whether the detected error is in an instruction or in data. The processor 20 may be able to determine whether an exception or interrupt occurred while it was processing an instruction or data, for example. This capability is provided in some types of processors but not in others, and therefore may be implementation- or architecture-dependent.

If an instruction/data determination is supported, then the error recovery module 12 may selectively flush and thereby cause an automatic reload of either the instruction memory area of the cache 16 where an instruction error is detected, or the data memory area of the cache where a data error is detected.

There may be situations in which the error recovery process should not be invoked or should be aborted. For example, the error recovery module 12 may determine a history of errors detected by the error detector 14 in order to determine whether to attempt error recovery. This error detection history may be maintained in a record stored in the main memory 18 or possibly another store and accessed by the error recovery module 12.

A time criterion, a number of detected errors criterion, or multiple criteria may be used to determine whether an error recovery process should be invoked, or if already invoked, whether that process should be aborted. The error recovery module 12 might check the time at which the most recent previous cache error was detected, and determine that the currently detected error is not recoverable if the current error was detected within a time threshold of the previous error detection. The current error might also be considered non-recoverable if the total number of errors detected in the device 10 to date is above an acceptable threshold. Where either, or in some embodiments both, of the time criterion and number of errors criterion is satisfied, the error recovery module 12 may conclude that the detected error is due to a hardware fault or other non-recoverable cause and abort recovery attempts.

Another possible recoverability decision criterion relates to the amount of unsynchronized information that has been modified in the cache 16 but not yet synchronized with the main memory 18. If the cache 16 includes more than a threshold amount of unsynchronized information when an error is detected, then the error might be considered non-recoverable. This criterion reflects the notion that, with higher amounts of unsynchronized information in the cache 16, it is more likely that a detected error affects unsynchronized information that has not yet been stored in the main memory 18, which in turn reduces the likelihood that the error is recoverable.

Any or all of the time, number, and amount thresholds may be predetermined or configurable.

Recoverability determinations provide for error recovery where the source of an error is transient, while avoiding frequent recovery attempts for errors that are due to a hard failure or other cause that leads to multiple back-to-back errors. In the latter scenario, it is unlikely that a software-based recovery mechanism, or any other recovery mechanism apart from a hardware replacement, could effectively recover from detected errors.

In the event that an error is determined to be non-recoverable, the error recovery process may be aborted. An escalation operation, such as raising an alarm or other form of alert or resetting the processor 20 or the entire device 10, may instead be performed. The error history that lead to the non-recoverable determination may also be made available for review by an operator or by another device or system. Such error information may be of use in considering whether the electronic device 10 or a particular component thereof should be replaced.

According to one embodiment, the error recovery module 12 also allows the software execution flow of the processor 20 to resume, but using information from the main memory 18. The information used by the processor 20 when it resumes processing may be retrieved directly from the main memory 18 or from the cache 16 if the cache is reloaded. Where the error recovery module 12 is implemented in exception or interrupt processing, for example, the software execution flow of the processor 20 automatically resumes when processing of the exception or interrupt completes. Other execution flow control mechanisms, in which the error recovery module 12 explicitly controls the software execution flow of the processor 20, are also possible. References to the error recovery module 12 allowing a software execution flow to resume are intended to cover these and other types of passive and active execution flow control.

It should be appreciated that although the processor 20 resumes codestream execution, it may return to a different point of execution than the point at which it was executing when the error detector 14 detected an error. If the error affected an instruction, for example, the processor 20 does not proceed with its processing of the corrupted instruction, and instead retrieves that instruction again, from the cache 16 or from the main memory 18 where the cache 16 has not yet been reloaded. References herein to resuming a software execution flow should be interpreted accordingly.

The software execution flow of the processor 20 may resume at any of various points during an error recovery process. For example, the error recovery module 12 could suspend the software execution flow of the processor 20 responsive to an error detection by the error detector 14, disable the use of the cache 16 by the processor, and then allow the execution flow to resume. While its use of the cache 16 is disabled, the processor 20 would operate in conjunction with the main memory 18. Although this would generally slow down the operation of the processor 20 unless and until use of the cache 16 is re-enabled, down time of the processor is minimized.

In some embodiments, use of the cache 16 by the processor 20 might not be re-enabled. After a certain number of errors have been detected, for example, the error recovery module 12 may allow the execution flow of the processor 20 to resume without re-enabling use of the cache 16. The processor 20 would run slower than normal in this mode of operation, since it accesses all required information in the main memory 18. An alarm or other form of alert could be generated when the processor 20 is running in this reduced capacity mode. Processing could instead be switched to a redundant processor or electronic device, if available.

Resumption of the software execution flow of the processor 20 could instead be delayed until the cache 16 has been reloaded to its previous state, although with uncorrupted information from the main memory 18. This approach may provide for the fastest operation of the processor 20 immediately after recovery, since the cache 16 has already been reloaded, but would involve suspending the execution flow for a longer time relative to the other approach described above. It should be appreciated, however, that this approach might not be feasible in all embodiments. Some caches, for example, are designed to reload only when enabled.

FIG. 1 and the foregoing description are illustrative of embodiments of the invention in the context of one possible electronic device and processor architecture. Other operations that have not been explicitly described may also be performed in an error recovery process. For example, error detection by the error detector 14 may be disabled by the error recovery module 12 after an error has been detected. Continued operation of the error detector 14 might otherwise cause recursive error recovery attempts. There may also be other ways of addressing this issue, such as configuring the error recovery module 12 to ignore further error detections by the error detector 14 until a current error recovery process has been completed or aborted.

Figure 2:
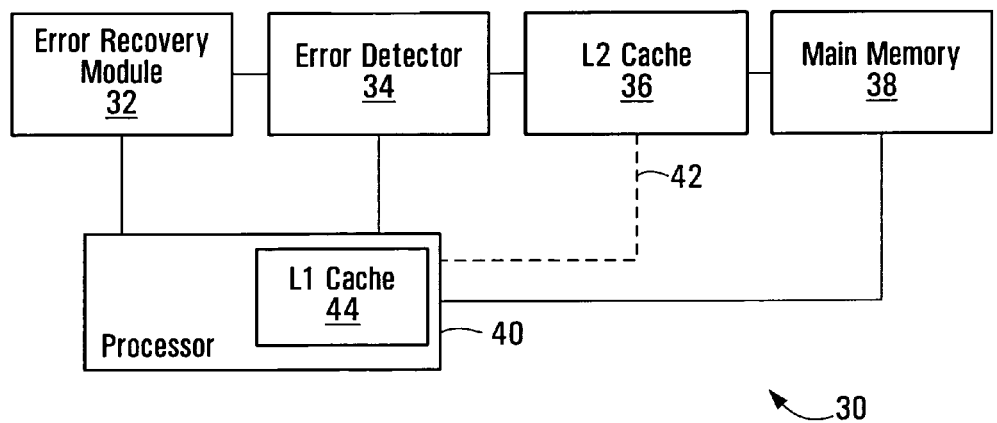
FIG. 2 is a block diagram of an electronic device having two caches.

Further variations of the techniques described above may also be or become apparent to those skilled in the art. FIG. 2 is a block diagram of another type of electronic device in which embodiments of the invention may be implemented. As shown, the electronic device 30 of FIG. 2 is substantially similar to the electronic device 10 (FIG. 1), but includes two caches, specifically an L1 cache 44 internal to the processor 40 and an external L2 cache 36. In one embodiment, the error recovery module 32, the error detector 34, the L2 cache 36, the connection 42, and the main memory 38 are identical to the similarly labelled components shown in FIG. 1 and described in detail above, and the processors 20, 40 are different processors.

An L1 cache 44 normally has respective memory areas, illustratively partitions, for storing instructions and data, whereas the L2 cache 36 might not distinguish between memory areas for storing instructions and data. If the error recovery module 32 or the processor 40 has the capability to determine whether an error was detected in an instruction or in data that was retrieved from the L2 cache 36, then the error recovery module may selectively cause caches to be subsequently reloaded by disabling, flushing, and re-enabling the L2 cache and either the instruction memory area of the L1 cache 44 or the data memory area of the L1 cache. The L1 instruction cache and/or the L1 data cache may thus be invalidated or flushed, respectively during the error recovery process.

Figure 3:
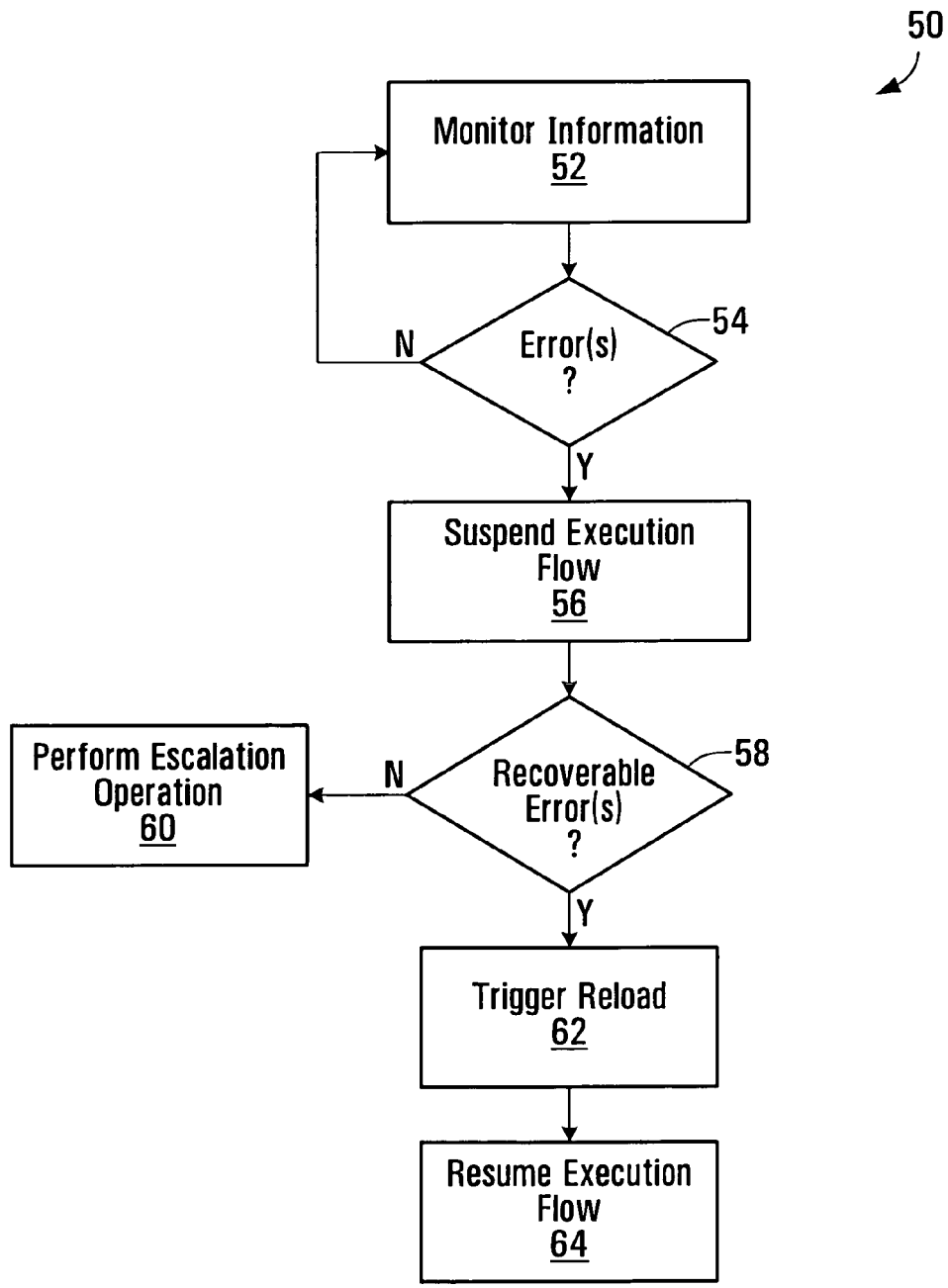
FIG. 3 is a flow diagram of an error recovery method.

Error recovery techniques may also or instead be embodied in a method. FIG. 3 is a flow diagram of one example of such an error recovery method.

The method 50 begins at 52 with an operation of monitoring information that is retrieved from an information store, illustratively a cache, for use by a processor in a software execution flow. Provided no errors are detected in the information, as determined at 54, monitoring continues.

Upon detection of an error, or possibly multiple errors, the software execution flow of the processor is suspended at 56. In some embodiments, a determination is made at 58 as to whether the detected error is recoverable, and if so, a reload of the information store from a further information store, such as a main memory, in which the retrieved information is also stored, is triggered at 62. As noted above, this may involve disabling and flushing a cache, so as to cause that cache to subsequently automatically reload. The software execution flow of the processor resumes at 64. Monitoring of information retrieved for use by the processor may also then resume at 52, and the method 50 may be repeated.

If it is determined at 58 that the error is non-recoverable, an escalation operation may be performed at 60.

The method 50 is illustrative of one possible embodiment of the invention. Various ways of performing the operations shown in FIG. 3 and additional operations that may be performed in other embodiments, some of which have been described above with reference to FIGS. 1 and 2, may be or become apparent to those skilled in the art. In general, further, fewer, or different operations may be performed in a similar or different order than explicitly shown without departing from the present invention.

Real-time processor to information store instruction and data corruption recovery as disclosed herein handles failures due to any of various causes with no, or minimal, processor downtime. This is accomplished by reacting to errors as they are detected, and may go beyond simply detecting/correcting bit-flips in cache memories using ECC or other hardware means.

Embodiments of the invention may be suitable for application to existing electronic devices that are already deployed. A software-based error recovery detection and recovery mechanism may be implemented as a software upgrade for instance, without costly hardware swapping and/or re-designs.

Providing an error recovery mechanism according to an embodiment of the invention may eliminate needless replacement of deployed products for intermittent (statistically rare) failures that might occur due to manufacturing defects inherent in components or external phenomena (i.e., soft-errors), for example. This mitigation strategy may also help reduce product returns and eliminate unnecessary customer perceived quality concerns over resets.

Robustness in applications such as telecommunication products may be improved by increasing the reliability of microprocessor/cache memory architectures at the heart of these products. The techniques disclosed herein may also be useful more generally in computing, storage area networks, and other high-reliability applications that are likely to use cache memories for performance benefits, where ECC protection is not a viable option.

What has been described is merely illustrative of the application of principles of embodiments of the invention. Other arrangements and methods can be implemented by those skilled in the art without departing from the scope of the present invention.

For example, the present invention is in no way limited to the example embodiments explicitly shown in the drawings and described above. The techniques disclosed herein could be applied to multiple information stores, such as both of the L1 and L2 caches in FIG. 2 for instance.

Error recovery could also be applied to other types of main memory/cache architectures, including caches used on such items as hard disk drives, interfaces to Flash drives, etc.

In addition, although described primarily in the context of methods and systems, other implementations of the invention are also contemplated, as instructions stored on a machine-readable medium, for example.

We claim:

1. An apparatus comprising:
   a first memory device comprising an information store;
   a second memory device comprising a further information store, the information store being loaded with information from the further information store;
   an error detector operable to detect an error in information retrieved from the information store for use by a processor in a software execution flow; and an error recovery module operatively coupled to the error detector, the error recovery module being operable, responsive to an error detection by the error detector, to suspend the software execution flow of the processor, to disable use of the information store by the processor, to allow the software execution flow of the processor to resume, and to allow the processor to retrieve information for use in the resumed software execution flow directly from the further information store without retrieving the information for use in the resumed software execution flow from the information store;

wherein the error recovery module is further operable to determine a history of errors detected by the error detector, and to abort resumption of the software execution flow where the error is detected by the error detector within a time threshold of a previous error detection by the error detector.

2. The apparatus of claim 1, wherein at least one of the error detector and the error recovery module is implemented in software for execution by the processor.

3. The apparatus of claim 1, wherein the error detector is operable to detect an error based on at least one of: a parity check and an error correction code check.

4. The apparatus of claim 1, wherein the error recovery module is operable to perform an escalation operation where the error is detected by the error detector within the time threshold of the previous error detection by the error detector.

5. The apparatus of claim 1, wherein the error recovery module is further operable to disable the error detector while the software execution flow is suspended.

6. The apparatus of claim 1, wherein the error recovery module is further operable to propagate to the further information store information that has been modified in the information store.

7. The apparatus of claim 1,
wherein the information store comprises a first memory area for storing instructions and a second memory area for storing data, and
wherein the error recovery module is further operable to determine whether the retrieved information comprises an instruction or data, to cause reloading of only the first memory area of the information store from the further information store where the retrieved information comprises an instruction, and to cause reloading of only the second memory area of the information store from the further information store where the retrieved information comprises data.

8. The apparatus of claim 1,
wherein the information store comprises a Level 2 (L2) cache and the further information store comprises a main memory,
wherein the processor comprises an internal Level 1 (L1) cache that has a first memory area for storing instructions and a second memory area for storing data, and
wherein the error recovery module is further operable to determine whether the retrieved information comprises an instruction or data, to cause reloading of the L2 cache and only the first memory area of the L1 cache from the main memory where the retrieved information comprises an instruction, and to cause reloading of the L2 cache and only the second memory area of the L1 cache from the main memory where the retrieved information comprises data.

9. The apparatus of claim 1, wherein the error recovery module is further operable to cause reloading of the information store from the further information store by re-enabling use of the information store by the processor.

10. An apparatus comprising:
a first memory device comprising an information store;
a second memory device comprising a further information store, the information store being loaded with information from the further information store;
an error detector operable to detect an error in information retrieved from the information store for use by a processor in a software execution flow; and
an error recovery module operatively coupled to the error detector, the error recovery module being operable, responsive to an error detection by the error detector, to suspend the software execution flow of the processor, to disable use of the information store by the processor, to allow the software execution flow of the processor to resume, and to allow the processor to retrieve information for use in the resumed software execution flow directly from the further information store without retrieving the information for use in the resumed software execution flow from the information store
wherein the error recovery module is further operable to determine an amount of information that has been modified in the information store, and to abort resumption of the software execution flow where the determined amount of information that has been modified in the information store is greater than a threshold amount.

11. An electronic device comprising:
the apparatus of claim 1; and
a processor operatively coupled to the first memory device and to the second memory device.

12. A method comprising:
monitoring information, which is retrieved from an information store in a first memory device for use by a processor in a software execution flow, to detect errors; and
responsive to detection of an error in the retrieved information:
suspending the software execution flow of the processor;
disabling use of the information store by the processor;
allowing the software execution flow of the processor to resume; and
allowing the processor to retrieve information for use in the resumed software execution flow directly from a further information store in a second memory device without retrieving the information for use in the resumed software execution flow from the information store,
the method further comprising, responsive to detection of the error in the retrieved information:
determining at least one of: a history of detected errors and an amount of information that has been modified in the information store; and
aborting resumption of the software execution flow where the error is detected within a time threshold of detection of a previous error, the determined amount of information that has been modified in the information store is greater than a threshold amount, or both.

13. The method of claim 12, wherein monitoring comprises performing at least one of: a parity checking operation and an error correction code checking operation.

14. The method of claim 12, further comprising:
performing an escalation operation where resumption of the software execution flow is aborted.

15. The method of claim 14, wherein the escalation operation comprises at least one of: raising an alert and resetting the processor.

16. The method of claim 12, wherein the information store comprises a first memory area for storing instructions and a second memory area for storing data, the method further comprising:
  determining whether the retrieved information comprises an instruction or data; and
  causing a reload of either only the first memory area or only the second memory area of the information store based on whether the retrieved information comprises an instruction or data.

17. The method of claim 12, wherein the information store comprises a Level 2 (L2) cache, the further information store comprises a main memory, and the processor comprises an internal Level 1 (L1) cache that has a first memory area for storing instructions and a second memory area for storing data, the method further comprising:
  determining whether the retrieved information comprises an instruction or data; and
  causing a reload of the L2 cache and either only the first memory area or only the second memory area of the L1 cache based on whether the retrieved information comprises an instruction or data.

18. A machine-readable medium storing instructions which when executed perform the method of claim 12.

* * * * *